United States Patent [19]

Prehn

[11] 4,177,486
[45] Dec. 4, 1979

[54] FACSIMILE DEVICE

[76] Inventor: Lawrence D. Prehn, OCSigO, 3C 340, The Pentagon, Washington 25, D.C. 20301

[21] Appl. No.: 566,382

[22] Filed: Dec. 2, 1944

[51] Int. Cl.$^2$ .............................................. H04N 1/44
[52] U.S. Cl. ...................................... 358/259; 178/22; 179/1.5 S
[58] Field of Search ........................... 178/5.2, 5.4, 22; 358/259; 179/1.5 S

[56] References Cited

U.S. PATENT DOCUMENTS

| | | | |
|---|---|---|---|
| 1,522,775 | 1/1925 | Friedman | 178/22 |
| 1,657,366 | 1/1928 | Belin | 178/22 |
| 1,763,358 | 6/1930 | Jenkins | 358/259 |
| 1,945,014 | 1/1934 | Wrede | 178/22 |
| 2,110,149 | 3/1938 | Rugh | 178/22 |
| 2,414,101 | 1/1947 | Hogan et al. | 358/259 |
| 2,437,255 | 3/1948 | Hogan et al. | 35/4 |

*Primary Examiner*—S. C. Buczinski
*Attorney, Agent, or Firm*—John R. Utermohle

EXEMPLARY CLAIM

1. In a facsimile system, a distributor including an array of n electrical contacts, a source of potential therefor and a normally rotating brush for applying potential from said source to said contacts in sequence, a plurality of cryptographic rotors in cascade, said cascade having n input and n output contacts, means for connecting said distributor contacts to said input contacts in pairs and means for connecting said output contacts together in groups to provide a sequence of n-x output signals from said cascade, a plurality of n-x switches each normally open and closable responsive to an electrical signal, each said switch being controlled by a separate one of said cascade output signals, a facsimile device including a drum carrying a subject to be transmitted and at least one dummy subject, a plurality of n-x scanning devices cooperating with said drum and the subjects carried thereby normally to derive n-x facsimile signals, an output line common to said switches, and means for connecting said scanning devices to said switches in pairs thereby to deliver to said output line signal segments from said scanning devices in a sequence determined by the output signals from said cascade of rotors.

1 Claim, 6 Drawing Figures

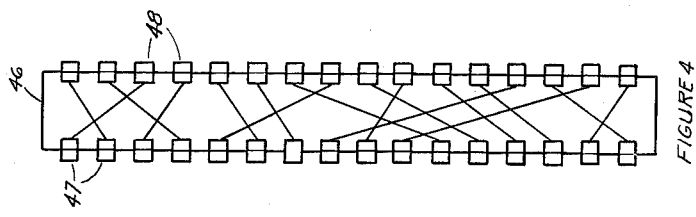
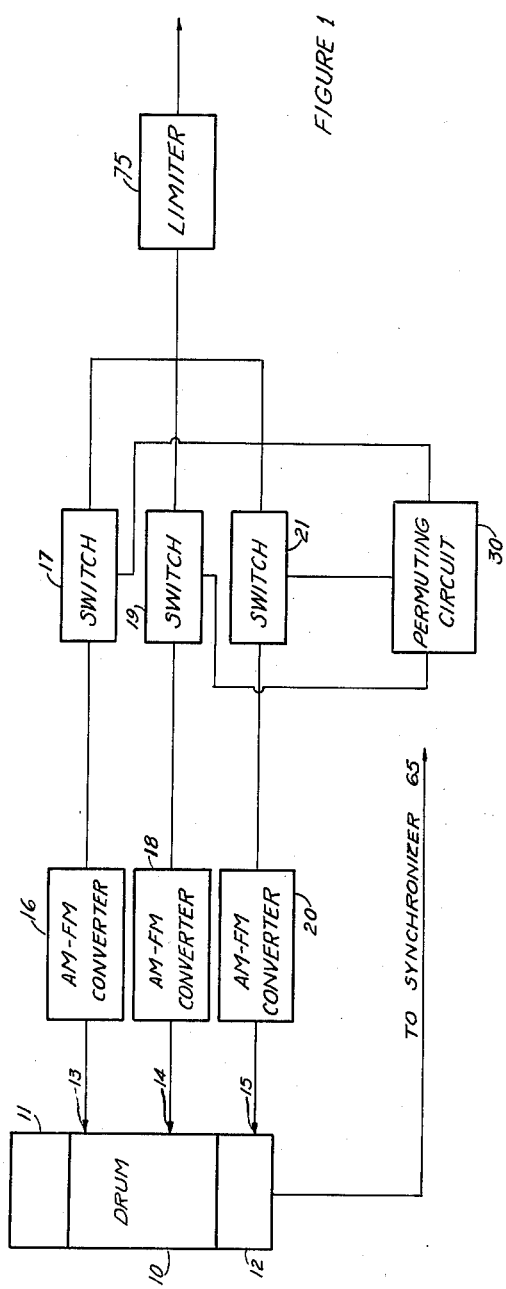
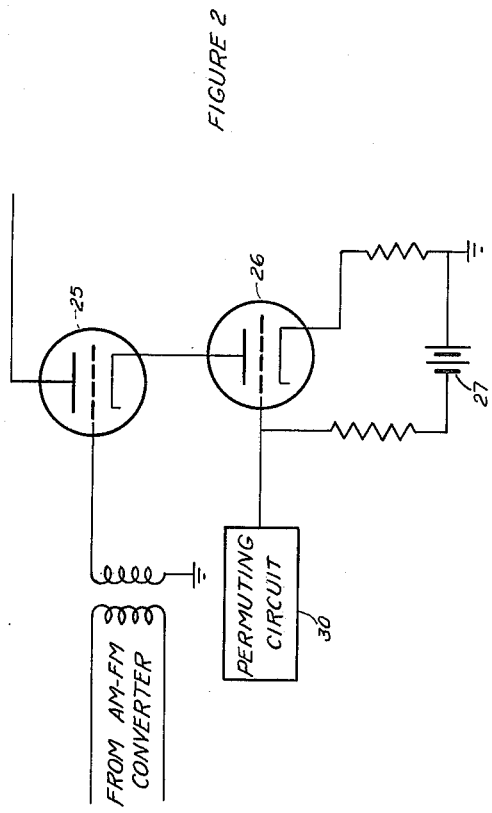

FACSIMILE DEVICE

This invention is in secret communications systems, particularly facsimile transmission systems. Specifically, it comprises an improved method and apparatus for so treating a facsimile signal derived from a subject picture, map or other document as to make the signal unintelligible except to a person having proper apparatus properly adjusted. Otherwise, the received signal will not produce a legible facsimile but, instead, merely an apparently random arrangement of small groups of picture elements; more specifically, according to this invention, signals representing small groups of picture elements are transposed with respect to their normal order in such a way that the transposition order is unpredictable.

The normal signal output of a telephoto or other facsimile pickup is a tone or signal, the amplitude of which at a particular instant is proportional to the photographic density of the subject at the point being scanned. In order to facilitate transmission by radio means and for certain other reasons, it is customary to convert the amplitude-modulated signal to an analogous frequency-modulated signal.

Various systems have already been developed for providing privacy in facsimile communications. One such system, of which this invention is representative, may be termed a transposition system since it provides an actual division of a facsimile signal into a very large number of minute "time lengths" and a transposition or redistribution thereof singly or in groups out of their normal sequence.

One object of this invention is to provide a means for transposing widely separated elements of a facsimile signal in such a manner that the encrypted signal may be transmitted over wire or radio.

Another object is to provide means for transposing widely separated variable-length segments of a facsimile signal in such a manner that the encrypted signal may be transmitted by wire or radio.

Other objects will be apparent from a reading of the following specification and claims.

FIG. 1 is a block diagram showing the principal elements of the invention and their relationships.

FIG. 2 is a schematic diagram of an "electronic switch" such as is utilized in the invention.

FIG. 4 is a diagrammatic showing of a cryptographic rotor such as it utilized in the apparatus of FIG. 3.

Figure 3:
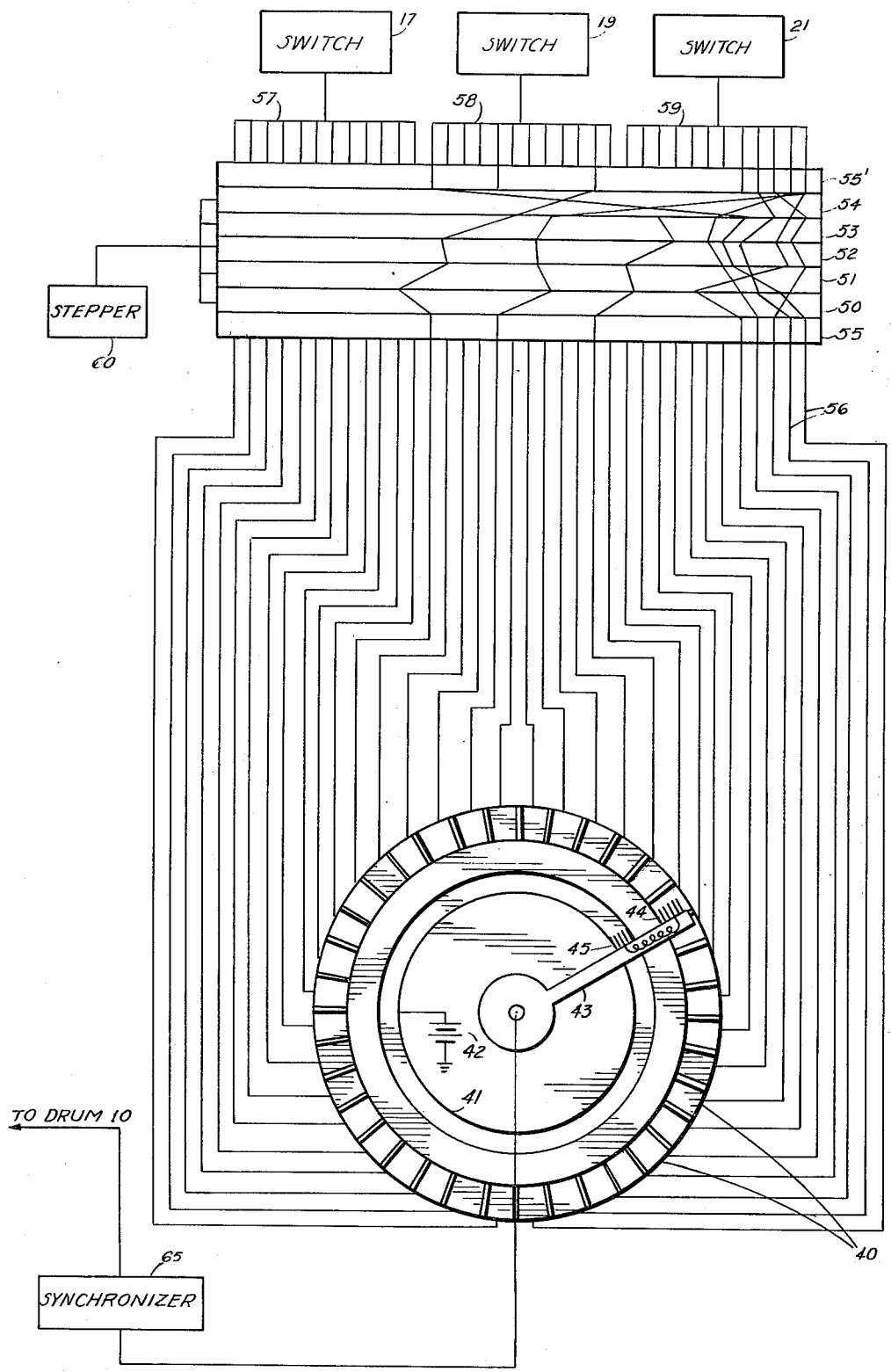
FIG. 3 is a schematic diagram of the preferred form of permuting apparatus.

Referring to the drawings and particularly to FIG. 1, the invention includes a drum 10 of a type commonly used with facsimile transmission apparatus. The drum is somewhat longer than would ordinarily be required. The central portion thereof is intended to carry the subject picture, map, or the like, which is desired to be transmitted, and two end portions 11 and 12 carry dummy pictures of other material. The necessity for the use of dummy pictures will be apparent from the description to follow.

In place of the single scanning beam of standard facsimile apparatus, this invention utilizes three scanners or pickups 13, 14 and 15, and these are displaced laterally of the drum. The amount of displacement will vary with the type of traffic to be handled since, as will be more apparent hereinafter, greater privacy is achieved as the pickups are separated more widely one from the other while on the other hand greater economy is obtained by positioning the pickups closer together. It should be understood that substantially the same effect as that provided by lateral displacement of the pickups can be produced by displacing the pickups radially, and for some purposes it may be desirable to displace them both laterally and radially.

An amplitude-modulated output of the pickup 13 is converted to a frequency-modulated signal by an AM-FM converter 16 and then introduced to an electronic switch 17, while the outputs of pickups 14 and 15 are similarly converted by converters 18 and 20, respectively, and fed into electronic switches 19 and 21. The three electronic switches are substantially identical, and, therefore, only one switch will be described and that but briefly.

Referring to FIG. 2, the switch may be seen to include vacuum tubes 25 and 26, the tube 25 being herein referred to as a "switching" tube and the tube 26 as a "control" tube. The control tube 26 is normally biased to cut-off by a suitable potential source, such as a battery 27, which will be assumed to provide a grid voltage of -10 volts. The switching tube 25 is rendered conductive and cut off by the control tube 26. A control voltage, for example, -5 volts, supplied from a permuting circuit 30 (later to be described), in parallel with the bias voltage connected to the grid of the control tube 26, causes the tube 26 and then the tube 25 to be rendered conductive. As will be apparent, other switching devices can be used in place of that illustrated in FIG. 2.

The permuting circuit 30, which supplies control voltage pulses to the electronic switches, is shown in its proper relation to the rest of the transmission circuit in FIG. 1 and somewhat more in detail in FIG. 3, from which latter figure it can be seen to include a distributor of substantially standard construction with thirty-six contact segments 40-40, a continuous contact ring 41, a battery 42, and a rotating arm 43, carrying brushes 44 and 45 which are adapted to sweep the contact segments 40-40, and the ring 41.

The permuting circuit proper comprises five rotors 50 to 54, inclusive, and two stators or end plates 55 and 51'. The rotors are of the type generally known as cryptographic rotors and described in the U.S. Pat. to Hebern, No. 1,683,072. Each includes thirtysix input contacts and thirty-six output contacts.

A conventional rotor is shown in diagram in FIG. 4. For convenience of illustration, less than thirty-six input and output contacts are shown. The rotor comprises a disc or body member, 46, of insulating material, a plurality of input contacts 47—47, and a like plurality of output contacts 48—48. Input and output contacts are connected internally of the rotor more or less at random.

Each of the contacts 40—40 of the distributor of FIG. 3, is connected, as by wires 56—56, to one of the input contacts of the stator 55. Signals are taken out of the rotor system through the second end plate 51', where, it will be seen, the output contacts are multipled in groups of twelve. The groups are represented by reference characters 57, 58 and 59.

In the preferred embodiment of the invention, the rotors 50 to 54, inclusive, are adapted for stepping in meter fashion. Many mechanisms are known for producing the desired stepping, and none will be described in detail herein, the rotor stepper being shown simply as a block 60 in FIG. 3.

By properly designing the rotors and synchronizing their movements, continuously rotating switching members can be used.

The stators 55 and 51', which are essentially similar to the rotors 50 through 54, of course, do not step. They are shown wired "straight through", but scrambled wiring may be employed if desired.

As the distributor arm 43 rotates, a -5 volt signal is transferred from the battery 42, through the slip ring 41 and the brushes 44 and 45, to individual ones of the contacts 40—40 and is applied over the wires 56—56 to the input contacts of the stator 55. From there, the individual signals are carried through the rotor system to the output stator 51', and to one of the electronic switches 17, 19 or 21.

The arm 43, carrying the brushes 44 and 45, is synchronized with the drum 10, carrying the picture to be transmitted, by means of a timing device 65, so that the drum 10 will make three revolutions for each revolution of the arm 43, and the pickups 13, 14 and 15 are displaced the width of one normal scanning line only after three revolutions of the drum 10.

Figure 5:
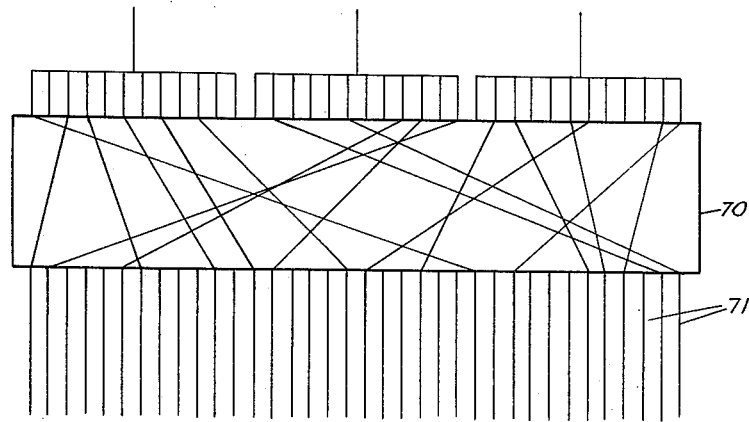
FIG. 5 is a diagram illustrating a somewhat different permuting arrangement than is shown in FIG. 3.

In place of the rotor system above described, a permuting device such as that shown in FIG. 5 may be utilized. Shown there is a plugboard 70, to one side of which are connected input wires 71—71, with each of the input wires being connected to one of the contact segments 40—40 of the distributor of FIG. 3.

The plugboard has thirty-six output contacts. Connections between input and output contacts are made substantially at random by means of jumper cords which can be removed and changed at will. The output wires are multipled in groups of twelve, and the three resulting leads connected individually to electronic switches, 17, 19 and 21.

Using the plugboard, the key is changed by hand at any interval decided upon in advance. The privacy obtainable is not as high as that which may be achieved with the rotor system earlier described wherein the key changes at much more frequent intervals, and a much longer keying cycle can be provided, but it is entirely usable for some purposes.

In operation, a map, photograph or other subject to be transmitted is clamped in position on drum 10, and dummy pictures are placed at each end thereof. The drum is then so arranged with respect to the scanners or pickups 13, 14 and 15 that all three pickups will be operative.

With the drum 10 rotating, signals will be generated by all of the scanners 13, 14 and 15, but will be transmitted to a limiter 75 only as the individual electronic switches, 17, 19 and 21 are caused by the permuting circuit 30 to conduct. Depending upon the wiring of the permuting circuit 30, one switch may conduct during the time that the brush 44 is traversing a single contact segment 40 of the distributor of FIG. 3, or it may conduct while the brush is sweeping as many as twelve consecutive contacts 40—40. The duration of conduction of all switches 17, 29 and 21, and the order in which they conduct may change for each change in key, that is, whenever a rotor of the group of rotors 50 to 54, inclusive, of FIG. 3 steps to a new position or two or more plugboard connections of FIG. 5 are changed.

The limiter circuit 75 is used to remove, from the signal to be transmitted, any undesirable transient voltages such as commonly develop in switching operations.

It will be apparent that, since only one of the three input circuits is closed at any given instant, two-thirds of the input is actually discarded. The effect of this loss is overcome through the use of scanning lines only one-third as wide as in a normal apparatus. Loosely, it may be said, therefore, that each element of the subject picture is scanned three times. Yet, since three heads are used instead of one, the total scanning operation takes no more time than would be required by a single scanning beam moving at normal speed.

Figure 6:
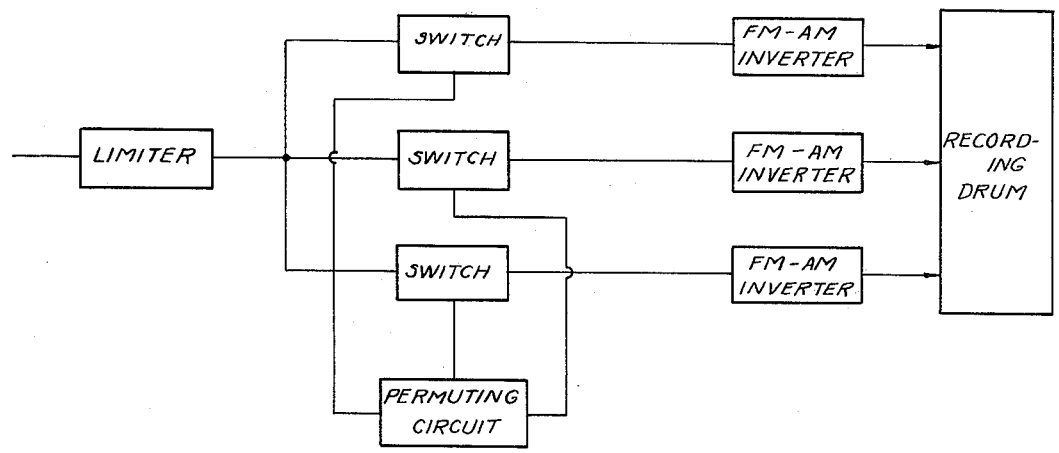
FIG. 6 is a schematic diagram of the receiving apparatus used with the transmitting apparatus of FIG. 1.

The receiving apparatus of FIG. 6 is, in all essential respects, like the transmitting apparatus, and in fact one set of equipment can be utilized for both sending and receiving.

The received signal is first introduced to a limiter to clip off transients arising through transmission, and is then introduced to three electronic switches in parallel. These switches are controlled by a permuting circuit so that their periods of conduction are identical both in order and duration with those of the switches 17, 19 and 21. The resulting three signals are inverted and recorded on film, sensitized paper, or some other conventional means.

The foregoing description is in specific terms, but it should be understood that the invention is not limited to the exact form shown and described. For the true scope of the invention, reference should be had to the appended claims.

I claim:

1. In a facsimile system, a distributor including an array of n electrical contacts, a source of potential therefor and a normally rotating brush for applying potential from said source to said contacts in sequence, a plurality of cryptographic rotors in cascade, aid cascade having n input and n output contacts, means for connecting said distributor contacts to said input contacts in pairs and means for connecting said output contacts together in groups to provide a sequence of n-x output signals from said cascade, a plurality of n-x switches each normally open and closable responsive to an electrical signal, each said switch being controlled by a separate one of said cascade output signals, a facsimile device including a drum carrying a subject to be transmitted and at least one dummy subject, a plurality of n-x scanning devices cooperating with said drum and the subjects carried thereby normally to derive n-x facsimile signals, an output line common to said switches, and means for connecting said scanning devices to said switches in pairs thereby to deliver to said output line signal segments from said scanning devices in a sequence determined by the output signals from said cascade of rotors.

* * * * *